US005422707A

United States Patent [19]

Takiguchi et al.

[11] Patent Number: 5,422,707

[45] Date of Patent: Jun. 6, 1995

[54] TOONER FOR DEVELOPING ELECTROSTATIC IMAGES, DETACHABLE APPARATUS, IMAGE FORMING APPARATUS AND FACSIMILE APPARATUS

[75] Inventors: Tsuyoshi Takiguchi, Yokohama; Tsutomu Kukimoto, Tokyo; Koichi Tomiyama, Kawasaki; Hiroshi Yusa; Tetsuhito Kuwashima, both of Yokohama, all of Japan

[73] Assignee: Canon Kabushiki Kaisha, Tokyo, Japan

[21] Appl. No.: 304,823

[22] Filed: Sep. 13, 1994

Related U.S. Application Data

[60] Continuation of Ser. No. 21,095, Feb. 23, 1993, abandoned, which is a division of Ser. No. 610,934, Nov. 9, 1990, Pat. No. 5,217,836.

[30] Foreign Application Priority Data

Nov. 9, 1989 [JP] Japan .................................. 1-289878

[51] Int. Cl.[6] ..................... G03G 9/083; G03G 15/06; G01D 15/06; H04N 1/21

[52] U.S. Cl. .................................... 355/245; 358/296; 430/106.6; 430/109; 430/904

[58] Field of Search ..................... 430/109, 106.6, 904; 355/245; 346/153.1; 358/296

[56] References Cited

U.S. PATENT DOCUMENTS

| | | | |
|---|---|---|---|
| 2,297,691 | 10/1942 | Carlson | 95/5 |
| 4,883,734 | 11/1989 | Ikeuchi et al. | 430/109 |
| 4,939,060 | 7/1990 | Tomiyama et al. | 430/106.6 |
| 4,950,574 | 8/1990 | Kumagai et al. | 430/109 |
| 4,966,829 | 10/1990 | Yasuda et al. | 430/109 |
| 4,968,574 | 11/1990 | Morita et al. | 430/109 |
| 4,971,879 | 11/1990 | Kimura et al. | 430/106.6 |

FOREIGN PATENT DOCUMENTS

| | | |
|---|---|---|
| 53-17737 | 2/1978 | Japan . |
| 58-118651 | 7/1983 | Japan . |
| 1-193870 | 7/1983 | Japan . |
| 60-123850 | 7/1985 | Japan . |
| 63-223662 | 9/1988 | Japan . |
| 64-70765 | 3/1989 | Japan . |

*Primary Examiner*—S. Rosasco

*Attorney, Agent, or Firm*—Fitzpatrick, Cella, Harper & Scinto

[57] ABSTRACT

A toner for developing an electrostatic image, comprises a binder resin and a colorant. The toner has a glass transition temperature (Tg) of 65° C. or lower. The binder resin comprises a styrene-acrylic copolymer formed from at least a styrenic monomer and a mixture of two or more acrylic monomers. The binder resin contains 10% by weight or more of THF insolubles. The amount of the styrenic monomer remaining in the toner is 0.005 part or less by weight based on 100 parts by weight of the binder resin component in the toner (50 ppm), and the amount of the acrylic monomers remaining in said toner is 0.001 part by weight based on 100 parts by weight or less of the binder resin component in the toner (10 ppm). At least one component of the mixture of acrylic monomers has a Q-value of 0.5 to less than 1.0 and the other has a Q-value of 0.3 to less than 0.5.

This toner is excellent in the anti-off-set property to a fixing roller surface, good in fixability, giving high image density and little odor.

62 Claims, 2 Drawing Sheets

TONER FOR DEVELOPING ELECTROSTATIC IMAGES, DETACHABLE APPARATUS, IMAGE FORMING APPARATUS AND FACSIMILE APPARATUS

This application is a continuation of application Ser. No. 08/021,095 filed Feb. 23, 1993, now abandoned, which, in turn, is a division of application Ser. No. 07/610,934, filed Nov. 9, 1990, now U.S. Pat. No. 5,217,836.

BACKGROUND OF THE INVENTION

1. Field of the Invention

This invention relates to a toner for developing electrostatic images. Further, the present invention relates to a detachable unit freely detachable from the main apparatus, comprising a chargeable body and a developing means holding a toner to develope electrostatic images. Further, the present invention relates to an image forming apparatus having a developing means holding the toner for developing electrostatic images. Further, the present invention relates to a facsimile apparatus using an electrophotographic apparatus as the printer.

2. Related Background Art

In the prior art, as the electrophotographic method, there have been known a large number of methods as described in U.S. Pat. No. 2,297,691, Japanese Patent Publication No. 42-23910, Japanese Patent Publication No. 43-24748. Generally, the method comprises utilizing a photoconductive substance, forming electrical latent images on a photosensitive body by various means, subsequently developing the latent images by use of a toner, transferring the toner images onto a transfer material such as paper, etc. if necessary, then fixing the images by various methods to obtain a copied product. As the fixing method, there are the pressure fixing system of passing through two or more metal rolls, the oven fixing system of passing through the heated atmosphere heated by an electrothermal heater, and the currently most popular hot-roll fixing system by passing through heated rollers.

The pressure heating system using heated rollers performs fixing by passing the sheet to be fixed through the hot rollers under pressure, where the toner image on the sheet is in contact with the roller surface which is made of a toner-releasing material. According to this method, since the surface of the hot roller contacts the toner image on the sheet to be fixed under pressure, heat efficiency during fusion of the toner image onto the sheet to be fixed is extremely good and also fixing can be effected rapidly, and therefore it is very effective in a high speed electrophotographic copying machine. In the above-mentioned method, since the hot roller surface comes in contact with the toner image in a melted state under pressure, a part of the toner image may adhere and transfer onto the surface of the fixing roller, which is retransferred onto the next sheet to be fixed to Give rise to the so-called off-set phenomenon, thereby contaminating the sheet to be fixed. It is one of the essential conditions of the hot roller fixing system to avoid adhesion of the toner onto the hot fixing roller surface.

For obtaining a toner satisfying the above essential conditions, improvements of the toner binder have been attempted. For example, Japanese Patent Publication No. 1-15063 proposes a developer by use of a resin in which a polyester resin and two kinds of vinyl resins of different gel contents (80% or more and less than 10% of THF insolubles) are simply blended. Japanese Patent Application Laid-open No. 63-223662 proposes a developer improved in the anti-off-set property by controlling the content of the THF insolubles in the binder resin in the toner.

As the polymerization method to obtain a resin containing such amount of THF insolubles as mentioned above, the suspension polymerization or emulsion polymerization method may be preferably employed.

Since these polymerization methods are carried out generally in aqueous solutions, after completion of the reaction, there exists no removal step of the solvent and the polymerizable monomer from the solution polymerization method, end also the temperature of the reaction system is limited. A resin containing much THF insolubles is liable to have the monomers confined within the resin, whereby the content of the remaining monomer in the resin must be larger. When the amount of the remaining monomer is large, there must problems such as (1) generation of odor during toner preparation, particularly during melting and kneading process, which degrades the working environment, or (2) generation of odor during image formation, giving unpleasant feelings. In recent years, recording methods using the electrophotographic method are expanding its application scope, so that now they are used in ordinary offices and homes. As to the developer, it has become necessary to pay attention not only to the safety of the substance of course, but also to the odor generation during fixing.

Japanese Patent Application Laid-open No. 55-155632 proposes the improvement of the anti-off-set property, storage property and fluidity by the use of a polymer as a binder resin for a developer, where the resin contains less than 0.1% by weight of the residual solvent or the polymerizable monomers used in the polymerization.

Japanese Patent Application Laid-open No. 53-17737 describes that remaining of the polymerizable monomers influences the triboelectric chargeability, blocking property and fixability of the developer. Further, as to the binder resin for developing, it has been proposed to reduce the remaining solvent or the polymerizable monomers used for obtaining the polymer.

Japanese Patent Application Laid-open No. 64-70765 proposes a resin for a developer with a remaining monomer content of 200 ppm or less by evaporating the water after polymerization, for overcoming such problems as degrading of the working environment particularly caused by the generation of odor during melting and kneading, or generation of odor during copying to give unpleasant sensations. In such literature, there is the description that antiblocking property and resistance to vinyl chloride plasticizer become low, or the problem of odor remains if the remaining monomer amount exceeds 200 ppm.

All of the toners obtained according to the methods as mentioned above were still not satisfactory in the improvement in both anti-off-set property and odor.

Particularly, in recent electrophotographic apparatus, for the prevention of ozone generation by high voltage application during formation of electrostatic latent images on the photosensitive body surface, contact charging means has been used in place of corona charging. As the result of substantial absence of ozone generation, in the electrophotographic apparatus by use of the contact charging means, it has become possible to eliminate an ozone filter, whereby the problem of odor of the developer becomes marked when no ozone filter is mounted.

On the other hand, in recent years, accompanying the speed-up of recording methods by the electrophotographic method, there have been developed various contrivances for improving fixability in the hot-roll fixing system. As the method for improving the binder resin, improvements have been made to lower the glass transition temperature, thereby enabling low temperature fixing of the developer. As the means for controlling the glass transition temperature (Tg) of the resin, the method of controlling the components of the resin may be employed. In the styrene-acrylic resin which has been used most generally as a binder resin, the method of increasing the ratio of the acrylic component in the resin has been employed. As the acrylic resin, one which has the significant effect of lowering the glass transition point (Tg) tends to be used frequently.

As described above, when the ratio of acrylic monomer of low reactivity as compared with styrene monomer is increased, the remaining amount of the monomer in the resin after completion of the polymerization will be also increased, whereby problems as mentioned above will be brought about. For this reason, resin synthesis is carried out by use of an acrylic component with higher reactivity. According to this method, although the amount of the remaining monomer in the resin is considerably reduced, a large amount of an acrylic monomer is required to lower the glass transition temperature (Tg). As a result, there is a tendency to reduce charge amounts resulting in lower developability, whereby the image density is lowered.

SUMMARY OF THE INVENTION

An object of the present invention is to provide a toner for developing electrostatic images which is excellent in the anti-off-set property to a fixing roller surface, good in fixability, can give high image density and has little odor.

Another object of the present invention is to provide a toner for developing electrostatic images having little odor and containing a binder resin polymerized in an aqueous medium.

Still another object of the present invention is to provide a toner for developing electrostatic images having a low glass transition temperature (Tg) and containing the binder resin with little remaining monomer.

Still another object of the present invention is to provide a toner for developing electrostatic images which generates little odor during toner manufacturing and can maintain well the working environment in a good condition.

Still another object of the present invention is to provide a toner generating little odor during image formation even when en image forming device not equipped with a filter such as an ozone filter, etc. is used.

Still another object of the present invention is to provide a detachable apparatus which can be freely detached from the main device having a developing means holding a toner for developing electrostatic images which can solve the various problems as mentioned above.

Still another object of the present invention is to provide an image forming apparatus having a developing means holding a toner for developing electrostatic images which can solve the various problems as mentioned above.

Still another object of the present invention is to provide a facsimile apparatus which uses as a printer an electrophotographic apparatus having a developing means holding a toner for developing electrostatic images which can solve the various problems as mentioned above.

Still another object of the present invention is to provide a toner for developing electrostatic images, comprising a binder resin and a colorant, the toner has a glass transition temperature (Tg) of 65° C. or lower, the binder resin comprises a styrene-acrylic copolymer made from at least a styrenic monomer and a mixture of two or more acrylic monomers and the binder resin containing 10% by weight or more of THF insolubles, wherein the amount of the residual styrenic monomer in the toner is 0.005 part by weight or less to 100 of the binder resin component in the toner (50 ppm), and the amount of the residual acrylic monomers in the toner is 0.001 part by weight or less to 100 parts by weight of the binder resin component in the toner (10 ppm), at least one of the acrylic monomers has a Q-value of 0.5 to less than 1.0 and the other having a Q-value of 0.3 to less than 0.5.

Still another object of the present invention is to provide a detachable apparatus comprising:

(a) a chargeable body for carrying electrostatic images thereon, (b) a charging means for charging the chargeable body, (c) a developing means for developing the electrostatic images carried on the chargeable body, the charging means and developing means being integrated together with the chargeable body to form a unit, the unit being freely detachable from the main apparatus, wherein the developing means holds a toner comprising a binder resin and a colorant, the toner having a glass transition temperature (Tg) of 65° C. or lower, the binder resin comprising a styrene-acrylic copolymer formed from at least a styrenic monomer and a mixture of two or more acrylic monomers and the binder resin containing 10% by weight or more of THF insolubles, wherein the amount of the styrenic monomer remaining in the toner is 0.005 part or less by weight based on 100 parts by weight of the binder resin component in the toner (50 ppm), and the amount of the acrylic monomers remaining in the toner is 0.001 part or less by weight based on 100 parts by weight of the binder resin component in the toner (10 ppm), at least one of the acrylic monomers having a Q-value of 0.5 to less than 1.0 and the other having a Q-value of 0.3 to less than 0.5.

Still another object of the present invention is to provide an image forming apparatus comprising:

(a) a chargeable body for carrying electrostatic images thereon, (b) a charging means for charging the chargeable body, (c) a developing means for developing the electrostatic images carried on the chargeable body, the charging means and developing means being integrated together with the chargeable body to form a unit, the unit being freely detachable from the main apparatus, (d) a transfer means for transferring the developed images developed by the developing means from the chargeable body to a transfer material and (e) a fixing means for fixing the unfixed toner images transferred onto the transfer material on said transfer material, wherein the developing means holds a toner comprising a binder resin and a colorant, the toner having a glass transition temperature (Tg) of 65° C. or lower, the binder resin comprising a styrene-acrylic copolymer formed from at least a styrenic monomer and a mixture of two or more acrylic monomers and the binder resin containing 10% by weight or more of THF insolubles, wherein the amount of the styrenic monomer remaining in the toner is 0.005 part or less by weight to 100 parts by weight of the binder resin component in the toner (50 ppm), and the amount of the acrylic monomers remaining in said toner is 0.001 part or less by weight to 100 parts by weight of the binder resin component in the toner (10 ppm), at least one of the acrylic monomers having a Q-value of 0.5 to less than 1.0 and the other having a Q-value of 0.3 to less than 0.5.

Still another object of the present invention is to provide a facsimile apparatus comprising:

(i) an electrophotographic imaging means, and (ii) a receiving means for receiving image information from remote terminals, wherein the electrophotographic imaging means comprising:

(a) a chargeable body for carrying electrostatic images thereon, (b) a charging means for charging the chargeable body, (c) a developing means for developing the electrostatic images carried on the chargeable body, the charging means and developing means being integrated together with the chargeable body to form a unit, the unit being freely detachable from the main apparatus, (d) a transfer means for transferring the developed images developed by the developing means from the chargeable body to a transfer material and (e) a fixing means for fixing the unfixed toner images transferred onto the transfer material on the transfer material, wherein the developing means holds a toner comprising a binder resin and a colorant, the toner having a glass transition temperature (Tg) of 65° C. or lower, the binder resin comprising a styrene-acrylic copolymer formed from at least a styrenic monomer and a mixture of two or more acrylic monomers and the binder resin containing 10% by weight or more of THF insolubles, wherein the amount of the styrenic monomer remaining in the toner is 0.005 part or less by weight to 100 parts by weight of the binder resin component in the toner (50 ppm), and the amount of the acrylic monomers remaining in the toner is 0.001 part or less by weight to 100 parts by weight of the binder resin component in the toner (10 ppm), at least one of the acrylic monomers having a Q-value of 0.5 to less than 1.0 and the other having a Q-value of 0.3 to less than 0.5.

DETAILED DESCRIPTION OF THE PREFERRED EMBODIMENTS

Figure 1:
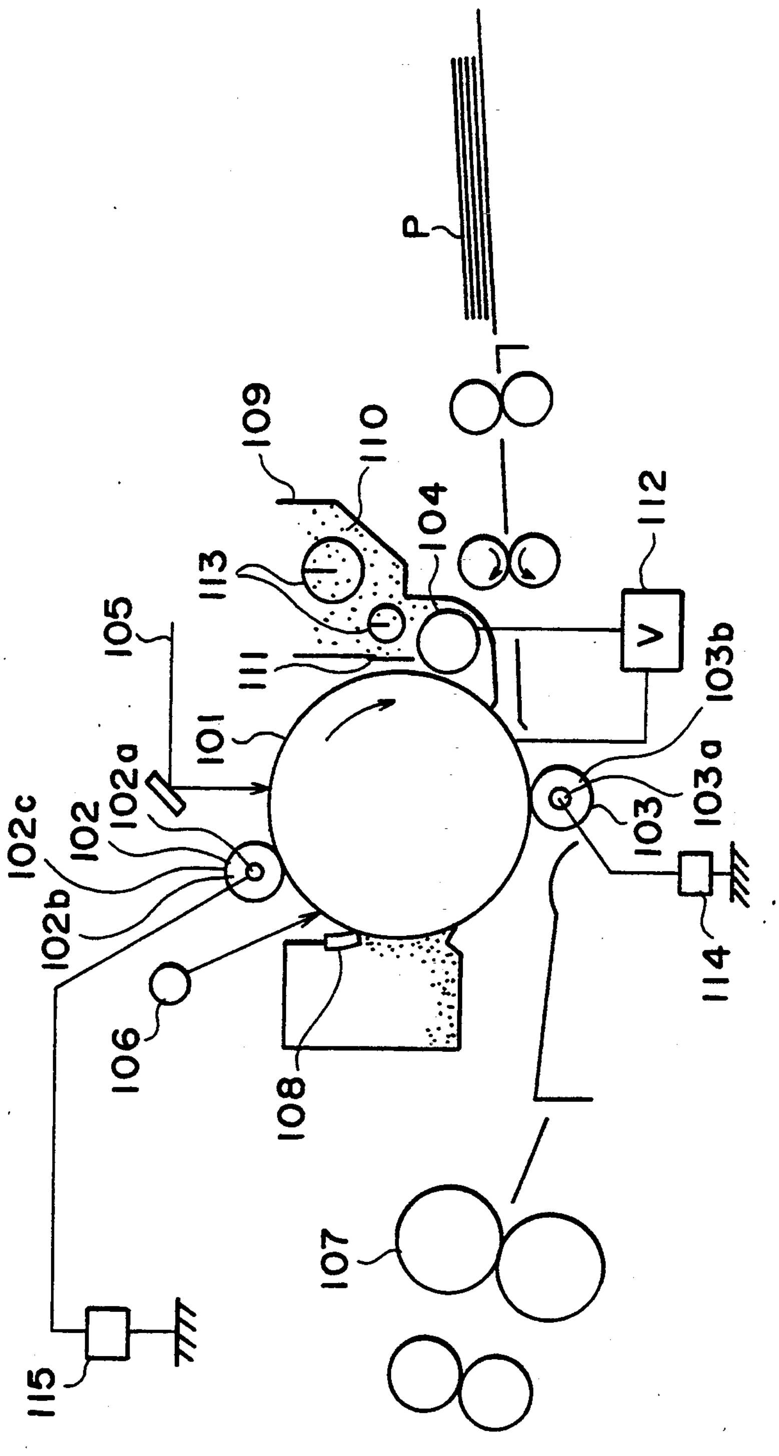
FIG. 1 is a schematic constitutional view of the image forming apparatus of the present invention.

In the styrene-acrylic binder resin contained in the toner of the present invention, the presence of a substantial amount of THF insolubles for anti-off-set property improvement and a certain amount of an acrylic monomer for fixability improvement is essential. The present inventors have mainly investigated the reduction of the remaining monomer in the binder resin. As a result, it could be confirmed that by use of an acrylic monomer with 0.5 to less than 1.0 of Q-value which is one of the measures of copolymerization reactivity, the residual monomer amounts (both styrenic and acrylic monomers) after the polymerization reaction could be markedly reduced.

Here, Q-value is a constant indicating reactivity of a monomer proposed by Alfrey and Price, and the larger Q-value is, the higher copolymerization reactivity.

We prepared and actually used a developing agent containing a negatively chargeable toner having a styrene-acrylic resin as a binder using the acrylic component having a Q-value of 0.5 to less than 1.0. The result was that, although the remaining monomer amount was reduced to 50 ppm or less based on the resin, the charging amount is low as compared with a toner comprising a styrene-acrylic binder using the acrylic component having a Q-value of 0.3 to less than 0.5, and also only low image density could be obtained.

The present inventors speculated the causes of this result as follows.

Generally speaking, Q-value is a measure of the resonance stability of radicals formed from a monomer, and the high Q-value means the high reactivity of formed radicals. That is, the stability of the radicals is low and, in other words, they are at a high energy level. For example, a methacrylic monomer generally has a higher Q-value than an acrylic monomer, which is interpreted as follows: A methacrylic monomer has a methyl group adjacent to the double bond of a vinyl group. This methyl group acts as an electron donor, and increases the orbital energy of the radical electron formed at the double bond position to make the radical unstable, whereby the reactivity is increased. Thus, the higher the Q-value of acrylic monomer is, the higher the electron density on the double bond of the vinyl group is.

In triboelectric charging of the negatively chargeable toner having a styrene-acrylic binder, most of the negative charges are considered to exist in the $\pi^*$ orbit on the benzene ring of styrene. In that case, an electrical field is generated around the benzene ring, whereby the groups having a bipolar moment existing therearound must be oriented along the electrical field. For example, the carbonyl group in acrylic group is oriented in the direction which makes the positively polarized carbon atom approach toward the negatively charged benzene ring, and the negatively polarized oxygen atom depart from the benzene ring. By the oriented bipolar moments, the negative charges on benzene ring are stabilized.

As the Q-value of the acrylic monomer becomes higher, namely the charge density on the double bond of vinyl group becomes higher, the charges also flow onto the carbon of carbonyl group to weaken the positive charge of the carbon. Therefore, the stabilization of negative charges on the benzene ring by the carbon becomes weak, and the benzene ring becomes hard to be chargeable. In other words, the higher the Q-value of the acrylic monomer is, the more the amount of triboelectric charges is reduced resulting in the poor developability. This problem also occurs similarly in a toner containing a negative charge control agent.

For the improvement of the developability, a styrene-acrylic binder comprising an acrylic monomer with low charge density on the double bond, namely of a low Q-value, may be employed, but if a monomer with a low Q-value is used, the above-mentioned problem of remaining monomer amount will occur.

As the result of the investigations by the present inventors, by the combination use of an acrylic monomer with a Q-value of 0.5 to less than 1.0 (for suppressing the remaining monomer amount) and an acrylic monomer with a Q-value of 0.3 to less than 0.5 (for imparting sufficient triboelectric charge amount to the acrylic monomer and the toner) at a specific ratio, the Tg of the resin is made 65° C. or lower, preferably 45° to 65° C. and the amount of resin components insoluble in THF are controlled to 10 parts or more, preferably 10 to 70 parts by weight to 100 parts of the resin. By doing so, it has been found that the both problems of the remaining monomer amount contained in the binder resin of the toner and the developability of the toner can be solved at once, with maintaining the anti-off-set property and good fixability of the toner. More specifically, in the present invention, when the amount of the acrylic monomer units with a Q-value of 0.5 to less than 1.0 contained in 100 parts by weight of the resin is defined as $n_1$ (part), and the amount of the acrylic monomer units with a Q-value of 0.3 to less than 0.5 as $n_2$ (part), preferably the following formulae should be satisfied:

$$5 \leqq n_1 + n_2 \leqq 45,\ 0.05 \leqq n_1/n_2 \leqq 3.0,$$

more preferably the following formulae should be satisfied:

$$10 \leqq n_1 + n_2 \leqq 38,\ 0.08 \leqq n_1/n_2 \leqq 2.0.$$

and more preferably, the following formulae should be satisfied:

$$25 \leqq n_1 + n_2 \leqq 35,\ 0.1 < n_1/n_2 < 2.0.$$

When the amounts of monomer units satisfy the above range, the amounts of the remaining monomers, analyzed by gas chromatography, were found to be 100 ppm or less of the styrenic monomer and 50 ppm or less of the acrylic monomer in the binder resin, and 50 ppm or less of the styrenic monomer and 10 ppm or less of the acrylic monomer in the toner based on the binder resin in the toner.

As a result, even when filters such as an ozone filter are removed from an image forming apparatus not using corona charging, there is little generation of odor, and also the temperature elevation within the apparatus can be prevented.

If the amounts of remaining monomers in the toner, exceed 0.005 part by weight (namely 50 ppm) for the styrenic monomer, and 0.001 part by weight (namely 10 ppm) for the acrylic monomer based on 100 parts by weight of the binder resin, odor is increased, whereby unpleasant sensations become obvious as the printing speed and the printing area (particularly solid black) are increased.

Quantitation of amounts of remaining monomers was conducted specifically according to the method as described below using Gas Chromatography Shimazu GCG-15A (Shimazu).

With 2.55 mg of DMF as an internal reference, an internal reference containing solvent is prepared by addition of 100 ml of acetone.

An amount 200 mg of a binder resin for toner is made up to 10 ml with the internal reference solution.

The above solution is applied to a UW-25 sonication vibrator (TAGA ELECTRIC K.K.) for 30 minutes, and then left to stand for one hour.

After one hour standing the solution is filtered by a filter (0.5 μm).

The injection volume of the sample is 4 μl.

The following conditions of gas chromatography are used:

capillary column (50 m×0.25 mm, ULBON HR-1, manufactured by Shinwa Kako K.K.);
detector: FID, nitrogen pressure: 0.45 kg/cm$^2$;
injection temperature: 200° C., detector temperature 200° C., and column temperature elevated from 50° C. at a rate of 5° C./min. for 30 minutes;
preparation of calibration curve.

For the standard sample, the known amounts of styrene monomer and the acrylic monomer to be measured are added to an acetone solution (the internal reference solution) containing the same amount of DMF as the sample solutions. Gas chromatographic measurement is conducted, and the weight ratio/area ratio of the styrenic monomer to the internal reference DMF and the weight ratio/area ratio of the acrylic monomer to the internal reference DMF are respectively determined.

In the present invention, the glass transition temperature (Tg) of the toner should be controlled to come below 65° C., more preferably within 50° to 62° C.

In the present invention, the glass transition temperature Tg of the resin and the toner was measured according to the ASTM-D3418-82 method using a differential scanning calorimetric measuring device (DSC measuring device), DSC-7 (Perkin Elmer).

The sample to be measured is weighed accurately in an amount of 5 to 20 mg, preferably 10 mg.

The weighed sample to be measured is placed in an aluminum pan, and after once elevated to 200° C. and quenched, the measurement is carried out under normal temperature and normal humidity at a temperature elevation rate of 10° C./min. at a measurement temperature range from 30° C. to 200° C. using an empty pan as a control.

In the temperature elevation process, a heat absorption peak in the range of temperature from 40° to 100° C. is obtained.

The intersecting point of a vertical line passing the middle point of the base line before and after advent of the heat absorption peak and the differential thermal curve is defined as the glass transition temperature (Tg).

The THF insolubles in the present invention is defined as the gel components which have become insoluble in THF by crosslinking in the resin composition contained in the toner. The weight ratio of the THF insolubles can be used as a parameter indicating the extent of crosslinking of the resin composition which contains highly crosslinkable components. The THF insolubles are defined by the value measured as described below.

When the toner is a non-magnetic toner, the contents of the THF insolubles other than the resin such as pigment, etc., are measured previously according to known methods, while for a magnetic toner, the contents of the THF insolubles other than the resin, such as pigment and magnetic material are measured. Next, a certain amount ($W_1$ g) ranging from 0.5 to 1.0 g of the toner or the developing agent is weighed, placed in a cylindrical filter paper (Toyo Roshi No. 86 R) and extracted by a Soxhlet's extractor with 100 to 200 ml of THF as a solvent for 6 hours. The solubles extracted with the solvent are evaporated, then dried under vacuum at 100° C. for several hours and the amount of the soluble resin components is weighed ($W_2$ g). Of the pigments and magnetic materials contained in the predetermined amount of the toner or the developing agent, the weight of the components soluble in THF is defined as $W_3$ g and the weight of the components insoluble in THF as $W_4$ g, and then the THF insolubles in the resin composition can be calculated according to the formula shown below:

$$\text{Content of THF insolubles} = [(W_1 - W_2 - W_4)/(W_1 - W_3 - W_4)] \times 100 \ (\%).$$

Of the copolymers constituting the binder resin in the toner of the present invention, as the styrene monomers in the styrene-acrylic copolymer of the present invention, there can be used styrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, and derivatives thereof.

As the acrylic monomers with a Q-value of 0.3 to less than 0.5 in the present invention, there can be used acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl ecrylate and the like.

Further, as the acrylic monomers with a Q-value of 0.5 to less than 1.0, there can be used methacrylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, dimethylaminoethyl methacrylate, diethylaminoethyl methacrylate, 2-hydroxyethyl methacrylate and the like. The Q-values of the monomers are generally described in various literatures, and reference can be made to the values as described in "Copolymerization" (published by Baihukan).

A monomer with a Q-value less than 0.3 and a monomer with a Q-value of 1.0 or more can be also used in combination to carry out copolymerization, provided that the amount is less than the styrenic monomer and the acrylic monomer.

As the crosslinking agent to be used in the resin for the toner of the present invention, polyfunctional crosslinking agents can be used.

Examples of a bifunctional crosslinking agent may include divinyl benzene, bis (4-acryloxypolyethoxyphenyl)propane, ethylene glycol diacrylate, 1,3-butylene glycol diacrylate, 1,4-butane diol diacrylate, 1,5-pentane diol diacrylate, 1,6-hexane diol diacrylate, neopentyl glycol diacrylate, diethylene glycol diacrylate, triethylene glycol diacrylate, tetraethylene glycol diacrylate, respective diacrylates of polyethylene glycol #200, #400, #600, dipropylene glycol diacrylate, polypropylene glycol diacrylate, polyester type diacrylate (MANDA Nippon Kayaku) and those as mentioned above in which acrylates are changed to methacrylates.

Examples of trifunctional or more polyfunctional crosslinking agents may include pentaerythritol triacrylate, trimethylolethane triacrylate, trimethylolpropane triacrylate, tetramethylolmethane tetraacrylate, oligoester acrylate and methacrylate thereof, 2,2-bis(4-methacryloxy, triethoxyphenyl)propane, diallyl phthalate, triallyl cyanurate, triallyl isocyanurate, triallyl trimellitate, diaryl chlorendate.

In the present invention, the amount of the crosslinking agent used in the resin for the toner may be 0.01 to 10 parts by weight, preferably 0.05 to 5 parts by weight, to 100 parts by weight of the monomers.

In the toner using the resin according to the present invention, for the purpose of improving various electrophotographic properties, in addition to the above binder resin components, compounds as mentioned below may be also contained within the range which does not harmfully affect the effects of the present invention, and at a ratio less than the content of the binder resin components.

As such compounds, for example, there may be included silicon resin, polyester, polyurethane, polyamide, epoxy resin, polyvinyl burytel, rosin, modified rosin, terpene resin, phenol resin, aliphatic or alicyclic hydrocarbon resin such as low molecular weight polyethylene or low molecular weight polypropylene, aromatic petroleum resin, chlorinated paraffin, paraffin wax, etc.

In the toner according to the present invention, generally known dyes, pigments and charge control agents can be formulated.

Particularly, in the toner of the present invention, an ethylenic olefin polymer may be also used together with the binder resin as an auxiliary fixing agent.

As the ethylenic olefin homopolymer or ethylenic olefin copolymer, there are polyethylene, polypropylene, ethylene-propylene copolymer, ethylene-vinyl acetate copolymer, ethylene-ethyl acrylate copolymer, ionomer having a polyethylene skelton, and in the above-mentioned copolymers, those containing 50 mole % or more of olefin monomer (more preferably 60 mole % or more) are preferred.

Because the binding resin used in the present toner requires not less than 10 parts of THF insolubles to 100 parts of the binding resin by weight, a polymerization method conducted in a solution such as suspension polymerization or emulsion polymerization is preferred. In addition, treatment of the resin for a few hours under reduced pressure at 70°–90° C. after the completion of the polymerization can remove the residual monomer and low-molecular components, so that the amount of the residual monomer in the binding resin can be reduced.

In the toner for developing electrostatic images of the present invention, a magnetic material can be contained and the toner can be used as the magnetic toner. As the magnetic material to be contained, a substance which can be magnetized when placed in a magnetic field, that is, a powder of a ferromagnetic metal such as iron, cobalt, nickel or an alloy or compound such as magnetite, $\gamma$-$Fe_2O_3$, ferrite, can be used.

The fine particles of these magnetic materials should be preferably magnetic powders having a BET specific surface area of 2 to 20 $m^2/g$, particularly 2.5 to 12 $m^2/g$ (nitrogen absorption method), and further a Mohs hardness of 5 to 7. The content of the magnetic powder should be preferably 70 to 120 parts by weight to 100 parts by weight of the binder resin.

The toner of the present invention as described above has the following effects.

(1) Since the amounts of remaining monomers are small, generation of odor during toner preparation is small and the working environment can be maintained in a good condition.

(2) Since the amounts of remaining monomers are small, odor generated during image formation is very small causing a few unpleasant sensations.

(3) Since the glass transition temperature (Tg) is low, anti-off-set property to the fixing roller is excellent.

(4) Since the acrylic monomer consists of at least two kinds of monomers having a Q-value of 0.5 to less than 1.0 and a Q-value of 0.3 to less than 0.5, even when the amounts of the acrylic monomers may be increased in order to lower the glass transition temperature (Tg), so that the amount of charging is not lowered, and developability is excellent, and image density is not lowered, giving an image of high quality.

(5) Even when the toner of the present invention is used in an image forming apparatus having no ozone filter, very little odor is generated.

Referring now to FIG. 1, the image forming apparatus of the present invention is described.

The numeral 102 is a charging roller which is a charging member brought into contact with the above-mentioned photosensitive drum 101 under a predetermined pressure, where the roller consists of the metal core 102*a* provided with an electroconductive rubber layer 102*b*, and a surface layer 102*c* (a releasable coating) on the peripheral surface of 102*b*. The electroconductive rubber layer should preferably have a thickness of 0.5 to 10 mm (more preferably 1 to 5 mm). The surface layer is a coating for improving releasability (releasable coating), and provision of a releasable coating is preferable in matching with the toner for developing electrostatic images according to the present invention. However, if the releasable coating has too great resistance, the photosensitive drum 101 will not be charged, while if the resistance is too small, excess voltage is applied on the photosensitive drum 101 causing damage to the drum or the generation of pinholes. Hence, it is preferable to have an adequate resistance value (preferably a volume resistivity of $10^9$ to $10^{14}$ ohm.m). The thickness of the releasable coating may be preferably within 30 $\mu m$ (preferably 10 to 30 $\mu m$). The lower limit of the releasable coating may be reduced as far as there is no peeling or tear-up, probably about 5 $\mu m$.

The charging roller 102 has an outer diameter of 12 mm$\phi$. The electroconductive rubber layer 2*b* having a thickness of about 3.5 mm is made of an ethylene-propylene-diene ternary copolymer (EPDM). The surface layer 2*c* is made of a nylon resin (specifically, methoxymethylated nylon) with a thickness of 10 $\mu m$. The charging roller 102 has a hardness of 54.5° (ASKER-C). 115 is a power source portion for applying a voltage on the charging roller 102, and supplies a predetermined voltage to the core metal 102*a* (diameter 5 mm) of the charging roller 102.

The numeral 103 is a transfer roller having a core metal 103*a* end an electroconductive elastic layer 103*b*. The electroconductive elastic layer 103*b* is made of an elastic material with a volume resistivity of $10^6$ to $10^{10}$ ohm.cm such as polyurethane resin or ethylene-propylene-diene ternary copolymer (EPDM) containing an electroconductive material such as carbon dispersed therein. On the core metal 103*a* is applied a bias by the constant voltage power source 114. As the bias conditions, a current value of 0.1 to 50 $\mu A$, a voltage (absolute value) of 100 to 5000 V (preferably 500 to 4000 V) are preferred.

In the following, the flow of forming an image is described.

At the charging roller (charging means) 102 having the power source unit (voltage applying means) 115, the photosensitive surface (chargeable body) is negatively charged, and a digital latent image is formed by image scanning by exposure 105 with a laser beam. The latent image is subjected to reversal developing with a negatively chargeable magnetic developing agent of one-component system (developing means) (110) containing the toner of the present invention, in the developing instrument 109 equipped with the developing sleeve 104 including the magnetic blade 111 and the magnet therein. At the developing section, between the electroconductive substrate of the photosensitive drum 101 and the developing sleeve 104, an alternate bias, a pulse bias and/or a direct current bias is applied by the bias applying means 112. When the transfer paper P is conveyed and comes to the transfer section, by charging from the back surface of the transfer paper P (the opposite surface to the photosensitive drum side) by the transfer roller (transfer means) 103 by the voltage applying means 114, the developed image (toner image) on the photosensitive drum surface is electrostatically transferred onto the transfer paper P. The transfer paper P separated from the photosensitive drum 101 is subjected to the fixing treatment for fixing the toner image on the transfer paper P by the heating and pressurizing roller fixer 107.

The one-component system developer remaining on the photosensitive drum after the transfer step is removed by a cleaner 108 having a cleaning blade. The photosensitive drum 101 after cleaning is deelectrified by erase exposure 106, and again the steps starting from the charging step with the charger 102 are repeated.

The electrostatic image holding body (photosensitive drum) 101 as the chargeable body has a photosensitive layer and an electroconductive substrate, and moves toward the arrowhead direction. The non-magnetic cylindrical developing sleeve 104 as a toner carrying body rotates at the developing section so as to progress in the same direction as the electrostatic image holding body. In the non-magnetic sleeve 104 is arranged a multi-pole permanent magnet (magnet roll) which is the magnetic field generating means so that it may not be rotated. The one-component system insulating magnetic developer 110 within the developing apparatus 109 is applied on the surface of the non-magnetic cylinder, and through friction between the surface of the sleeve 104 and the toner particles, the toner particles get, for example, negative triboelectric charges. Further, by arrangement of a magnetic doctor blade 111 made of iron close by the cylindrical surface (gap 50 $\mu m$–500 $\mu m$) in the opposite direction from one magnet pole position of the multi-pole permanent magnet, the thickness of the developer layer can be regulated thinly (30 μm-300 μm) and uniformly to make the developer layer thinner than the gap between the electrostatic image holding body 101 and the toner carrying body (non-magnetic cylindrical sleeve) 104 at the developing section so as to become non-contacting. By controlling the image speed of the toner carrying body 104, the speed of the sleeve surface is made substantially equal or approximate to the speed of the electrostatic image holding surface. The opposed magnet pole may be also formed by use of a permanent magnet in place of iron as the magnetic doctor blade 111. An alternate bias or pulse bias may be also applied by the bias means 512 between the toner carrying body 104 and the electrostatic image holding surface at the developing section.

During the transfer of the toner particles at the developing section, the toner particles are transferred through the action of the electrostatic force on the electrostatic image holding surface and the alternate bias or pulse bias.

In place of the magnetic doctor blade 111, an elastic blade formed on an elastic material such as silicone rubber may be also used to regulate the layer thickness of the developer layer by pressing pressure, thereby coating the developer on the developer carrying body.

For the charging means 102 for charging the surface of the photosensitive body negative, a charger which charges the surface of the photosensitive body by general corona charging may he employed in place of the charging roller in contact with the photosensitive body surface.

For the transfer means 103 for electrostatically transferring the developed image on the photosensitive body surface onto the transfer paper P, a transfer means which transfers the developed image by corona charging onto the transfer paper may be employed instead of the transfer roller which comes into contact with the transfer paper.

In the case when either one of the means which performs corona charging as mentioned above, more ozone is generated and therefore it is preferable to mount an ozone filter, etc.

As the image forming apparatus, of the constituent elements such as photosensitive body (chargeable body), developing means, charging means, etc., more than one constituent may be integrated into a unit to constitute a detachable apparatus, which is freely detachable from the main apparatus. For example, at least one selected from the charging means, developing means and cleaning means may be supported together with the photosensitive body to form a unit apparatus freely detachable from the main apparatus, where the detachability may be conducted by use of a guide means such as rails on the main apparatus, etc. In this case, the charging means and/or the developing means can be integrated into the above-mentioned detachable apparatus.

Figure 2:
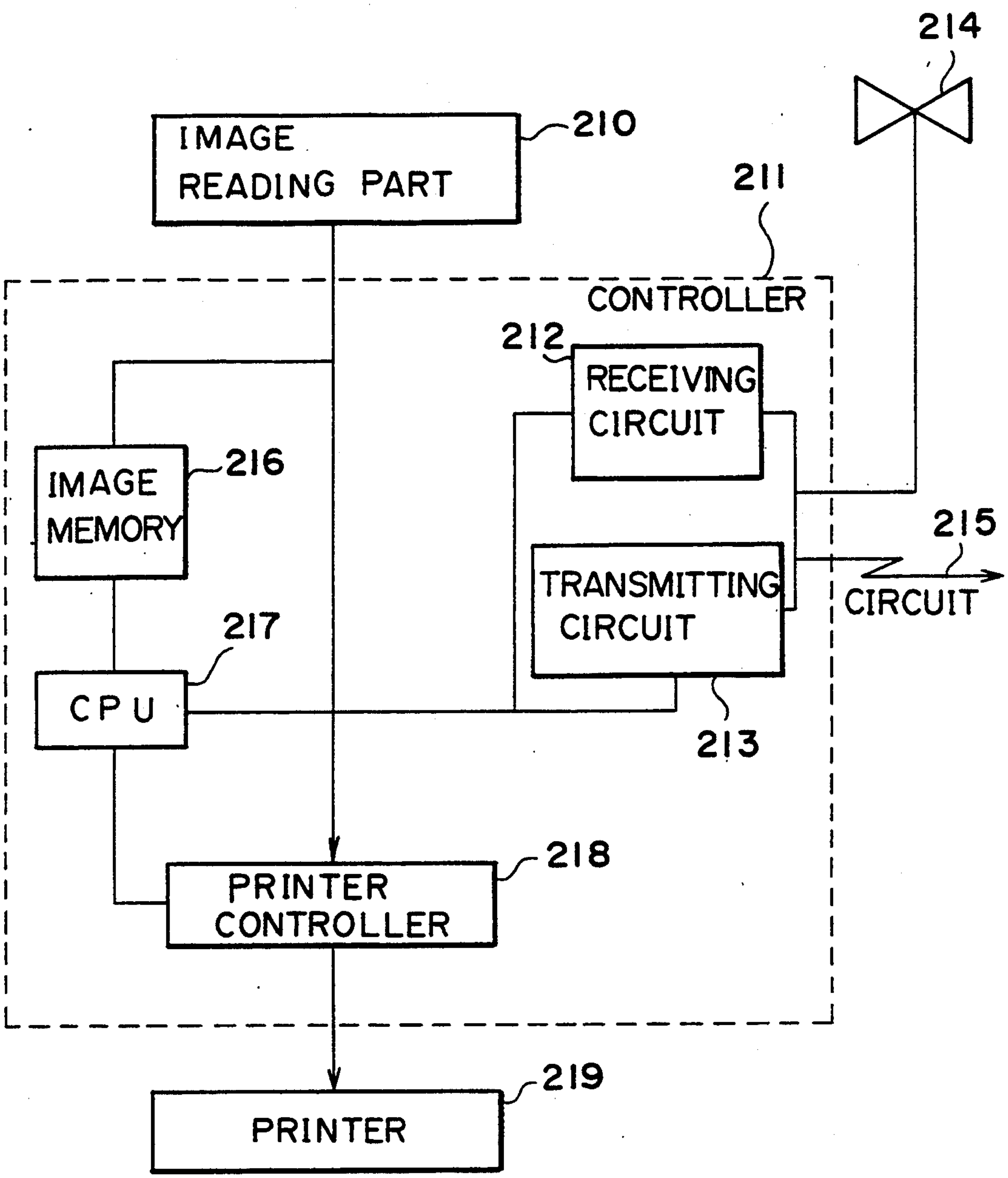
FIG. 2 is a block diagram of the facsimile apparatus employing the electrophotographic apparatus as the printer.

In the case when the image forming apparatus of the present invention is used as the printer of facsimile, the photoimage exposure 105 is the exposure for printing the received data. FIG. 2 shows an example of this case by a block diagram.

The controller 211 controls the image reading section 210 and the printer 219. The whole controller 211 is controlled by CPU 217. The data read from the image reading section are sent through the sending circuit 213 to the partner. The date received from the partner are sent through the receiving circuit 212 to the printer 219. In the image memory, given image data are memorized. The printer controller 218 controls the printer 219. 214 is a telephone.

The image received through the circuit wire 215 (image information from the remote terminal connected through the circuit wire) is modulated again by the receiving circuit 212, then subjected to signal restoration processing of the image information by CPU 217 and successively housed in the image memory 216. When at least one page of image is housed in the memory 216, image recording of that page is performed. CPU 217 sends out the signal-restored image information of one page read from the memory 216 to the printer controller 218. The printer controller 218 on receipt of the image information of one page from CPU 218 controls the printer 219 so as to perform image information recording of that page.

CPU 217 is performing receipt of the next page during recording by the printer 219.

As described above, receiving and recording of the image are performed.

The present invention is described in detail below by referring to examples, but these are not limitative of the present invention at all.

In the examples, parts and % all represent parts by weight and % by weight.

SYNTHESIS EXAMPLE 1

Into a reactor were charged and mixed 63 parts of styrene monomer (Q-value=1.0), 22 parts of n-butyl acrylate monomer (Q-value=0.43), 13 parts of n-butyl methacrylate monomer (Q-value=0.67), 0.6 part of divinylbenzene and 2 parts of benzoyl peroxide, and then 170 parts of water were added to form a suspension, followed by suspension polymerization reaction at a reaction temperature of 70° to 95° C. for 8 hours. After completion of the reaction, the reduced-pressure treatment was carried out at 80° C. for two hours to remove the residual monomer and low-molecular compounds. After that the mixture was filtered to obtain a copolymer composition. The thus obtained resin composition had THF insolubles of 54% and a glass transition point Tg of 59° C.

THF insolubles of the resin composition were measured as described below. About 0.5 g ($W_1$) of the resin composition was weighed, placed in a cylindrical filter (Toyo Roshi, No. 86 R: 28×100 mm), and extracted by a Soxhlet's extractor using 200 ml of THF as a solvent for 6 hours. The extraction cycle of THF in the Soxhlet's extractor was once per about 4 minutes.

After THF solubles extracted with THF were evaporated, the residue was dried under reduced pressure at a temperature of 100° C., and the weight ($W_2$) of THF solubles was measured.

$$\text{THF insolubles } (\%)=[(W_1-W_2)/W_1]\times 100$$

SYNTHESIS EXAMPLE 2

Into a reactor were charged and mixed 68 parts of styrene monomer (Q-value=1.0), 10 parts of n-butyl acrylate monomer (Q-value=0.43), 20 parts of n-butyl methacrylate monomer (Q-value=0.67), 0.55 part of divinylbenzene and 1.8 parts of benzoyl peroxide, and then 170 parts of water were added to form a suspension, followed by suspension polymerization reaction at a reaction temperature of 70° to 85° C. for 8 hours. After completion of the reaction, the reduced-pressure treatment was carried out at 80° C. for two hours to remove the residual monomer and low-molecular compounds. After that, the mixture was filtered to obtain a copolymer composition. The resin composition obtained had a glass transition point Tg of 62° C. and THF insolubles of 46%, measured according to the same method as described in Synthesis example 1.

SYNTHESIS EXAMPLE 3

Into a reactor were charged and mixed 65 parts of styrene monomer (Q-value=1.0), 28 parts of n-butyl acrylate monomer (Q-value=0.43), 3 parts of methyl methacrylate monomer (Q-value=0.74), 2 parts of 2-hydroxyethyl methacrylate monomer (Q-value=0.80), 0.5 part of divinylbenzene and 2 parts of benzoyl peroxide, and then 170 parts of water were added to form a suspension, followed by suspension polymerization reaction at a reaction temperature of 70° to 95° C. for 8 hours. After completion of the reaction, the reduced-pressure treatment was carried out at 80° C. for two hours to remove the residual monomer and low-molecular compounds. After that, the mixture was filtered to obtain a copolymer composition. The resin composition obtained had THF insolubles of 38% as measured according to the same method as described in Synthesis example 1 and a glass transition point Tg of 60° C.

COMPARATIVE SYNTHESIS EXAMPLE 1

Into a reactor were charged and mixed 63 parts of styrene monomer, 35 parts of n-butyl methacrylate monomer, 0.1 part of divinylbenzene and 2.0 parts of benzoyl peroxide, and then 170 parts of water were added to form a suspension, followed by suspension polymerization reaction at a reaction temperature of 70° to 95° C. for 5 hours. After completion of the reaction, the mixture was filtered to obtain a copolymer composition. The resin composition obtained had a glass transition point Tg of 59° C. and THF insolubles of 4% measured according to the same method as described in Synthesis example 1.

COMPARATIVE SYNTHESIS EXAMPLE 2

Into a reactor were charged and mixed 73 parts of styrene monomer, 25 parts of methyl acrylate monomer, 2 parts of divinylbenzene and 1.4 parts of benzoyl peroxide, and then 170 parts of water were added to form a suspension, followed by suspension polymerization reaction at a reaction temperature of 80° to 95° C. for 5 hours. After completion of the reaction, the mixture was filtered to obtain a copolymer composition. The resin composition obtained had THF insolubles of 82% measured according to the same method as described in Synthesis example 1 and a glass transition point Tg of 67° C.

TABLE 1

| Resin | THF insolubles (%) | Glass transition point (°C.) | Residual monomers (ppm) Styrene monomer | Residual monomers (ppm) Acrylic monomer (total) |
|---|---|---|---|---|
| Synthesis Example 1 | 54% | 59° C. | 67 | 41 |
| Synthesis Example 2 | 46 | 62 | 50 | 27 |
| Synthesis Example 3 | 38 | 60 | 95 | 48 |
| Comparative Synthesis Example 1 | 4 | 59 | 43 | 40 |
| Comparative Synthesis Example 2 | 82 | 67 | 235 | 176 |

TABLE 1-continued

EXAMPLE 1

| | |
|---|---|
| Resin of Synthesis example 1 | 100 parts |
| Magnetite particles (particle size 0.3μ) | 60 parts |
| Negatively chargeable control agent (monoazo dye type chromium complex) | 1 part |
| Low molecular weight polypropylene (Mw = 6000) | 3 parts. |

The above mixture was melted and kneaded by a twin screw extruder heated to 140° C., the cooled kneaded product was coarsely crushed and the coarsely crushed product was finely pulverized by a jet mill. The fine powder obtained was classified by wind force to obtain a magnetic toner (I) (Tg 57° C.) with a volume average particle size of 11.5 μm).

EXAMPLE 2

| | |
|---|---|
| Resin of Synthesis example 2 | 100 parts |
| Magnetite particles (particle size 0.3μ) | 60 parts |
| Negatively chargeable control agent (monoazo dye type chromium complex) | 1 part |
| Low molecular weight polypropylene (Mw = 6000) | 3 parts. |

The above mixture was subjected to the same procedures as in Example 1 to obtain a toner (II) (Tg 59° C.).

EXAMPLE 3

| | |
|---|---|
| Resin of Synthesis example 3 | 100 parts |
| Magnetite particles (particle size 0.3μ) | 60 parts |
| Negatively chargeable control agent (monoazo dye type chromium complex) | 1 part |
| Low molecular weight polypropylene (Mw = 6000) | 3 parts. |

The above mixture was subjected to the same procedures as in Example 1 to obtain a toner (III) (Tg 58° C.).

COMPARATIVE EXAMPLE 1

| | |
|---|---|
| Resin of Comparative synthesis example 1 | 100 parts |
| Magnetite particles (particle size 0.3μ) | 60 parts |
| Negatively chargeable control agent (monoazo dye type chromium complex) | 1 part |
| Low molecular weight polypropylene (Mw = 6000) | 3 parts. |

The above mixture was subjected to the same procedures as in Example 1 to obtain a toner (IV) (Tg 57° C.).

COMPARATIVE EXAMPLE 2

| | |
|---|---|
| Resin of Comparative synthesis example 2 | 100 parts |
| Magnetite particles (particle size 0.3μ) | 60 parts |
| Negatively chargeable control agent (monoazo dye type chromium complex) | 1 part |
| Low molecular weight polypropylene (Mw = 6000) | 3 parts. |

The above mixture was subjected to the same procedures as in Example 1 to obtain a toner (V) (Tg 61° C.).

To each of the thus obtained magnetic toners (I) to (V) was added a colloidal silica fine powder, and the mixture was mixed by a Henschel mixer to obtain magnetic toners (A) to (E) externally added with a colloidal silica fine powder.

The individual magnetic toners (A) to (E) were subjected to the real printing tests of continuously forming solid black images by the reversal developing system using an image forming device (Canon, modified LBP-8II machine) at an modified printing speed of 16 sheets (AS)/min. under normal temperature/normal humidity (25° C./60% RH), and the printout images were evaluated. The developing conditions here were made as follows:

[the minimum gap between the lamination type OPC photosensitive drum and the coated developing sleeve coated with a phenolic resin containing fine carbon graphite particles (including fixed magnet): about 300 μm, the gap between the magnetic blade and the coated developing sleeve: about 250 μm, the thickness of the magnetic toner layer on the coated developing sleeve: about 130 μm, the developing bias: alternate current bias (Vpp 1600 V, frequency 1800 Hz) and direct current bias (−390 V)].

The conditions of the transfer roller were made as follows:

[surface rubber hardness of transfer roller: 27°, transfer current: 1 μA, transfer voltage: +2000 V, contact pressure: 50 [g/cm], electroconductive elastic layer of transfer roller: EPDM having electroconductive carbon dispersed therein, volume resistivity of electroconductive elastic layer: $10^8$ ohm.cm].

The conditions of the charging roller were made as follows:

[roller diameter: 12 mm, core diameter: 5 mm, electroconductive rubber layer thickness of the charging roller: 3.5 mm, mold release coating: methoxymethylated nylon, thickness 20 μm, contact pressure with OPC photosensitive member: total pressure 1.2 kg].

In addition to the evaluations of the printout images, also the odor at the exhaust outlet of the device was evaluated under the state where the ozone filter was removed.

Under the state where the surface temperature of the roller on the fixer is maintained at 200° C., anti-off-set property and fixability were evaluated. Anti-off-set property was evaluated after removing the cleaning device of the fixing roller, by evaluating the back contamination of the second sheet of the solid black passing papers under the state where no oil was coated. Fixability was evaluated for the first sheet immediately after weight-up. Further the triboelectric charge of the toner was measured.

TABLE 2

| | Magnetic Toner No. | Residual monomers (ppm) Styrene monomer | Acrylic monomer (total) | *1 Odor | Fix-ability | *2 Anti-offset property | Charge of toner (μc/g) | Solid black density (average from initation to 100 sheets) |
|---|---|---|---|---|---|---|---|---|
| Example 1 | (A) | 39 | ≦10 | ○ | ○ | ○ | −10 | 1.25 |
| Example 2 | (B) | 26 | ≦10 | ○ | ○ | ○ | −9 | 1.25 |
| Example 3 | (C) | 48 | ≦10 | ○ | ○ | ○ | −11 | 1.3 |
| Comparative Example 1 | (D) | 13 | ≦10 | ○ | ○ | X | −6 | 1.0 |
| Comparative Example 2 | (E) | 105 | 87 | X | X | ○ | −11 | 1.3 |

*1 Evaluation of odor: ○ Extremely small odor Δ A slight odor X Considerable odor (panel: 5)
*2 Charge amount of toner: Toner on the sleeve is recovered and measured by blow off method.

We claim:

1. An apparatus unit detachable from a main body of an image forming apparatus, comprising at least:

(a) a chargeable body for carrying electrostatic images thereon, and (b) a developing means for developing the electrostatic images carried on said chargeable body, wherein said developing means holds a toner comprising a binder resin and a colorant, said toner having a glass transition temperature (Tg) of 65° C. or lower, said binder resin comprising a styrene-acrylic copolymer formed from at least a styrenic monomer and a mixture of two or more acrylic monomers and said binder resin containing 10% by weight or more of THF insolubles, wherein the amount of the styrenic monomer remaining in said toner is 0.005 part by weight or less based on 100 parts by weight of the binder resin component in the toner and the amount of the acrylic monomers remaining in said toner is 0.001 part by weight or less based on 100 parts by weight of the binder resin component in the toner, said styrene-acrylic copolymer satisfies the following expressions:

$$10 \leqq n_1 + n_2 \leqq 38,\ 0.08 \leqq n_1/n_2 \leqq 2.0,$$

where $n_1$ is parts by weight of an acrylic monomer unit having a Q-value of 0.5 to less than 1.0 contained in 100 parts by weight of said styrene-acrylic copolymer; and $n_2$ is parts by weight of an acrylic monomer unit having a Q-value of 0.3 to less than 0.5 contained in 100 parts by weight of said styrene-acrylic copolymer.

2. The apparatus unit detachable from said main body according to claim 1, wherein said binder resin has 10 to 70% by weight of THF insolubles.

3. The apparatus unit detachable from said main body according to claim 1, wherein said styrene-acrylic copolymer satisfies the following expressions:

$$25 \leq n_1 + n_1 \leq 35,\ 0.1 \leq n_1/n_2 \leq 2.0$$

where $n_1$ is parts by weight of an acrylic monomer unit having a Q-value of 0.5 to less than 1.0 contained in 100 parts by weight of said styrene-acrylic copolymer; and $n_2$ is parts by weight of an acrylic monomer unit having a Q-value of 0.3 to less than 0.5 contained in 100 parts by weight of said styrene-acrylic copolymer.

4. The apparatus unit detachable from said main body according to claim 1, wherein said toner has a glass transition temperature (Tg) of 45°–65° C.

5. The apparatus unit detachable from said main body according to claim 1, wherein said toner has a glass transition temperature (Tg) of 50°–62° C.

6. The apparatus unit detachable from said main body according to claim 1, wherein said styrene-acrylic copolymer comprises a styrene-acrylic copolymer which is crosslinked by addition of a crosslinking agent.

7. The apparatus unit detachable from said main body according to claim 6, wherein said methacrylic acid ester monomer is n-butyl methacrylate monomer, and said acrylic acid ester monomer is n-butyl acrylate monomer.

8. The apparatus unit detachable from said main body according to claim 6, wherein said methacrylic acid ester monomer is a mixture of methyl methacrylate monomer and 2-hydroxyethyl methacrylate monomer, and said acrylic acid ester monomer is n-butyl acrylate monomer.

9. The apparatus unit detachable from said main body according to claim 6, wherein the crosslinked styrene-acrylic copolymer comprises a crosslinked styrene-n-butyl acrylate-n-butyl methacrylate copolymer.

10. The apparatus unit detachable from said main body according to claim 6, wherein the crosslinked styrene-acrylic copolymer comprises a crosslinked styrene-n-butyl acrylate-methyl methacrylate-2-hydroxyethyl methacrylate copolymer.

11. The apparatus unit detachable from said main body according to claim 6, wherein said crosslinking agent is added in an amount of 0.01 to 10 parts based on 100 parts by weight of the monomer.

12. The apparatus unit detachable from said main body according to claim 1, wherein the acrylic monomer having a Q-value of 0.5 to less than 1.0 is a methacrylic acid ester and the acrylic monomer having a Q-value of 0.3 to less than 0.5 is an acrylic acid ester.

13. The apparatus unit detachable from said main body according to claim 1, wherein said styrene-acrylic copolymer is a styrene-acrylic acid ester-methacrylic acid ester copolymer.

14. The apparatus unit detachable from said main body according to claim 1, wherein said binder resin is a polymer polymerized in an aqueous medium.

15. The apparatus unit detachable from said main body according to claim 1, wherein said toner is a magnetic toner containing a magnetic material.

16. The apparatus unit detachable from said main body according to claim 15, wherein said magnetic material is contained in an amount of 70 to 120 parts by weight based on 100 parts by weight of the binder resin.

17. The apparatus unit detachable from said main body according to claim 1, wherein said toner contains an ethylenic olefin polymer.

18. The apparatus unit detachable from said main body according to claim 1, wherein said toner contains silica fine powder externally added.

19. The apparatus unit detachable from said main body according to claim 1 including at least one of a charging means and a cleaning means integrated therein.

20. The apparatus unit detachable from said main body according to claim 19, wherein said charging means is in contact with said chargeable body.

21. An image forming apparatus comprising:

(a) a chargeable body for carrying electrostatic images thereon, (b) a charging means for charging said chargeable body, (c) a developing means for developing the electrostatic images carried on said chargeable body, said charging means and developing means being integrally supported together with said chargeable body to form a unit, said unit being freely detachable from the main apparatus, (d) a transfer means for transferring the developed images developed by said developing means from the chargeable body to a transfer material, and (e) a fixing means for fixing the unfixed toner images transferred onto said transfer material, wherein said developing means holds a toner comprising a binder resin and a colorant, said toner having a glass transition temperature (Tg) of 65° C. or lower, said binder resin comprising a styrene-acrylic copolymer formed from at least a styrenic monomer and a mixture of two or more acrylic monomers and said binder resin containing 10% by weight or more of THF insolubles, wherein the amount of the styrenic monomer remaining in said toner is 0,005 part by weight or less based on 100 parts by weight of the binder resin component in the toner, and the amount of the acrylic monomers remaining in said toner is 0.001 part by weight or less based on 100 parts by weight of the binder resin component in the toner, said styrene-acrylic copolymer satisfies the following expressions:

$$10 \leq n_1 + n_2 \leq 38,\ 0.08 \leq n_1/n_2 \leq 2.0,$$

where $n_1$ is parts by weight of an acrylic monomer unit having a Q-value of 0.5 to less than 1.0 contained in 100 parts by weight of said styrene-acrylic copolymer; and $n_2$ is parts by weight of an acrylic monomer unit having a Q-value of 0.3 to less than 0.5 contained in 100 parts by weight of said styrene-acrylic copolymer.

22. The image forming apparatus according to claim 21, wherein said binder resin has 10 to 70% by weight of THF insolubles.

23. The image forming apparatus according to claim 21, wherein said styrene-acrylic copolymer satisfies the following expressions:

$$25 \leq n_1 + n_1 \leq 35,\ 0.1 \leq n_1/n_2 \leq 2.0$$

where $n_1$ is parts by weight of an acrylic monomer unit having a Q-value of 0.5 to less than 1.0 contained in 100 parts by weight of said styrene-acrylic copolymer; and $n_2$ is parts by weight of an acrylic monomer unit having a Q-value of 0.3 to less than 0.5 contained in 100 parts by weight of said styrene-acrylic copolymer.

24. The image forming apparatus according claim 21, wherein said toner has a glass transition temperature (Tg) of 45°–65° C.

25. The image forming apparatus according to claim 21, wherein said toner has a glass transition temperature (Tg) of 50°–62° C.

26. The image forming apparatus according to claim 21, wherein said styrene-acrylic copolymer comprises a styrene-acrylic copolymer which is crosslinked by addition of a crosslinking agent.

27. The image forming apparatus according to claim 26, wherein said methacrylic acid ester monomer is n-butyl methacrylate monomer, and said acrylic acid ester monomer is n-butyl acrylate monomer.

28. The image forming apparatus according to claim 26, wherein said methacrylic acid ester monomer is a mixture of methyl methacrylate monomer and 2-hydroxyethyl methacrylate monomer, and said acrylic acid ester monomer is n-butyl acrylate monomer.

29. The image forming apparatus according to claim 26, wherein the crosslinked styrene-acrylic copolymer comprises a crosslinked styrene-n-butyl acrylate-n-butyl methacrylate copolymer.

30. The image forming apparatus according to claim 26, wherein the crosslinked styrene-acrylic copolymer comprises a crosslinked styrene-n-butyl acrylate-methyl methacrylate-2-hydroxyethyl methacrylate copolymer.

31. The image forming apparatus according to claim 26, wherein said crosslinking agent is added in an amount of 0.01 to 10 parts based on 100 parts by weight of the monomer.

32. The image forming apparatus according to claim 21, wherein the acrylic monomer having a Q-value of 0.5 to less than 1.0 is a methacrylic acid ester and the acrylic monomer having a Q-value of 0.3 to less than 0.5 is an acrylic acid ester.

33. The image forming apparatus according to claim 21, wherein said styrene-acrylic copolymer is a styrene-acrylic acid ester-methacrylic acid ester copolymer.

34. The image forming apparatus according to claim 21, wherein said binder resin is a polymer polymerized in an aqueous medium.

35. The image forming apparatus according to claim 21, wherein said toner is a magnetic toner containing a magnetic material.

36. The image forming apparatus according to claim 35, wherein said magnetic material is contained in an amount of 70 to 120 parts by weight based on 100 parts by weight of the binder resin.

37. The image forming apparatus according to claim 21, wherein said toner contains an ethylenic olefin polymer.

38. The image forming apparatus according to claim 21, wherein said toner contains silica fine powder externally added.

39. The image forming apparatus according to claim 21, wherein said charging means is in contact with said chargeable body.

40. The image forming apparatus according to claim 21, wherein said transfer means is in contact with said chargeable body.

41. The image forming apparatus according to claim 21, wherein said charging means and said transfer means are both in contact with said chargeable body.

42. A facsimile apparatus comprising:

(i) an electrophotographic imaging means, and (ii) a receiving means for receiving image information from remote terminals, wherein said electrophotographic imaging means comprising:

(a) a chargeable body for carrying electrostatic images thereon, (b) a charging means for charging said chargeable body, (c) a developing means for developing the electrostatic images carried on said chargeable body, said charging means and developing means being integrally supported together with said chargeable body to form a unit, said unit being freely detachable from the main apparatus, (d) a transfer means for transferring the developed images developed by said developing means from the chargeable body to a transfer material, and (e) a fixing means for fixing the unfixed toner images transferred onto said transfer material on said transfer material, wherein said developing means holds a toner comprising a binder resin and a colorant, said toner having a glass transition temperature (Tg) of 65° C. or lower, said binder resin comprising a styrene-acrylic copolymer formed from at least a styrenic monomer and a mixture of two or more acrylic monomers and said binder resin containing 10% by weight or more of THF insolubles, wherein the amount of the styrenic monomer remaining in said toner is 0.005 part by weight or less based on 100 parts by weight of the binder resin component in the toner, and the amount of the acrylic monomers remaining in said toner is 0.001 part by weight or less based on 100 parts by weight of the binder resin component in the toner, said styrene-acrylic copolymer satisfies the following expressions:

$$10 \leqq n_1+n_2 \leqq 38,\ 0.08 \leqq n_1/n_2 \leqq 2.0,$$

where $n_1$ is parts by weight of an acrylic monomer unit having a Q-value of 0.5 to less than 1.0 contained in 100 parts by weight of said styrene-acrylic copolymer; and $n_2$ is parts by weight of an acrylic monomer unit having a Q-value of 0.3 to less than 0.5 contained in 100 parts by weight of said styrene-acrylic copolymer.

43. The facsimile apparatus according to claim 42, wherein said binder resin has 10 to 70% by weight of THF insolubles.

44. The facsimile apparatus according to claim 42, wherein said styrene-acrylic copolymer satisfies the following expressions:

$$25 \leqq n_1+n_1 \leqq 35,\ 0.1 \leqq n_1/n_2 \leqq 2.0$$

where $n_1$ is parts by weight of an acrylic monomer unit having a Q-value of 0.5 to less than 1.0 contained in 100 parts by weight of said styrene-acrylic copolymer; and $n_2$ is parts by weight of an acrylic monomer unit having a Q-value of 0.3 to less than 0.5 contained in 100 parts by weight of said styrene-acrylic copolymer.

45. The facsimile apparatus according to claim 42, wherein said toner has a glass transition temperature (Tg) of 45°–65° C.

46. The facsimile apparatus according to claim 42, wherein said toner has a glass transition temperature (Tg) of 50°–62° C.

47. The facsimile apparatus according to claim 42, wherein said styrene-acrylic copolymer comprises a styrene-acrylic copolymer which is crosslinked by addition of a crosslinking agent.

48. The facsimile apparatus according to claim 47, wherein said methacrylic acid ester monomer is n-butyl methacrylate monomer, and said acrylic acid ester monomer is n-butyl acrylate monomer.

49. The facsimile apparatus according to claim 47, wherein said methacrylic acid ester monomer is a mixture of methyl methacrylate monomer and 2-hydroxyethyl methacrylate monomer, and said acrylic acid ester monomer is n-butyl acrylate monomer.

50. The facsimile apparatus according to claim 47, wherein the crosslinked styrene-acrylic copolymer comprises a crosslinked styrene-n-butyl acrylate-n-butyl methacrylate copolymer.

51. The facsimile apparatus according to claim 47, wherein the crosslinked styrene-acrylic copolymer comprises a crosslinked styrene-n-butyl acrylate-methyl methacrylate-2-hydroxyethyl methacrylate copolymer.

52. The facsimile apparatus according to claim 47, wherein said crosslinking agent is added in an amount of 0.01 to 10 parts based on 100 parts by weight of the monomer.

53. The facsimile apparatus according to claim 42, wherein said binder resin is a polymer polymerized in an aqueous medium.

54. The facsimile apparatus according to claim 42, wherein said toner is a magnetic toner containing a magnetic material.

55. The facsimile apparatus according to claim 54, wherein said magnetic material is contained in an amount of 70 to 120 parts by weight based on 100 parts by weight of the binder resin.

56. The facsimile apparatus according to claim 42, wherein said toner contains an ethylenic olefin polymer.

57. The facsimile apparatus according to claim 42, wherein said toner contains silica fine powder externally added.

58. The facsimile apparatus according to claim 42, wherein the acrylic monomer having a Q-value of 0.5 to less than 1.0 is a methacrylic acid ester and the acrylic monomer having a Q-value of 0.3 to less than 0.5 is an acrylic acid ester.

59. The facsimile apparatus according to claim 42, wherein said styrene-acrylic copolymer is a styrene-acrylic acid ester-methacrylic acid ester copolymer.

60. The facsimile apparatus according to claim 42, wherein said charging means is in contact with said chargeable body.

61. The facsimile apparatus according to claim 42, wherein said transfer means is in contact with said chargeable body.

62. The facsimile apparatus according to claim 42, wherein said charging means and said transfer means are both in contact with said chargeable body.

* * * * *

UNITED STATES PATENT AND TRADEMARK OFFICE
CERTIFICATE OF CORRECTION

PATENT NO. : 5,422,707

DATED : June 6, 1995

INVENTOR(S) : TSUYOSHI TAKIGUCHI, ET AL.

It is certified that error appears in the above-identified patent and that said Letters Patent is hereby corrected as shown below:

COLUMN 1

Line 60, "Give" should read --give--.

COLUMN 2

Line 16, "end" should read --and--.
Line 21, "must" should read --exist--.
Line 31, "the" should be deleted.

COLUMN 3

Line 57, "en" should read --an--.

COLUMN 8

Line 3, "Quantitation" should read --Quantification--.
Line 60, "is" should read --are--.

COLUMN 9

Line 42, "ecrylate" should read --acrylate--.

COLUMN 11

Line 18, "a few" should read --few--.
Line 24, "even when" should read --when--.

COLUMN 13

Line 28, "he" should read --be--.
Line 66, "date" should read --data--.

UNITED STATES PATENT AND TRADEMARK OFFICE
CERTIFICATE OF CORRECTION

PATENT NO. : 5,422,707

DATED : June 6, 1995

INVENTOR(S) : TSUYOSHI TAKIGUCHI, ET AL.

It is certified that error appears in the above-identified patent and that said Letters Patent is hereby corrected as shown below:

COLUMN 17

Line 40, "an" should read --a--.
Line 41, "(AS)" should be deleted.

COLUMN 19

Line 8, "$n_1 + n_1$" should read --$n_1 + n_2$--.

COLUMN 20

Line 10, "claim 1" should read --claim 1,--.
Line 42, "0,005 part" should read --0.005 part--.
Line 67, "$n_1 + n_1$" should read --$n_1 + n_2$--.

COLUMN 22

Line 62, "$n_1 \div n_1$" should read --$n_1 \div n_2$--.

Signed and Sealed this

Twenty-fourth Day of October, 1995

Attest:

BRUCE LEHMAN

*Attesting Officer* *Commissioner of Patents and Trademarks*